US008688357B2

(12) United States Patent
Kato et al.

(10) Patent No.: US 8,688,357 B2
(45) Date of Patent: Apr. 1, 2014

(54) CONTROL DEVICE FOR INTERNAL COMBUSTION ENGINE (75) Inventors: Naoto Kato, Susono (JP); Shinichi Soejima, Gotenba (JP); Kiyonori Takahashi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1068 days.

(21) Appl. No.: 12/672,337

(22) PCT Filed: Jan. 15, 2009

(86) PCT No.: PCT/JP2009/050461
§ 371 (c)(1),
(2), (4) Date: Feb. 5, 2010

(87) PCT Pub. No.: WO2010/082332
PCT Pub. Date: Jul. 22, 2010

(65) Prior Publication Data
US 2011/0071747 A1 Mar. 24, 2011

(51) Int. Cl.
*F02P 5/00* (2006.01)
*F02D 35/02* (2006.01)

(52) U.S. Cl.
CPC ............. *F02D 35/025* (2013.01); *F02D 35/02* (2013.01); *F02D 35/028* (2013.01)
USPC . 701/111; 701/102; 123/406.41; 123/406.19; 123/406.22; 123/406.26

(58) Field of Classification Search
CPC ..... F02D 35/02; F02D 35/023; F02D 35/028; F02D 2041/1409; F02D 2041/1431; F02D 2250/18; F02D 2250/21; F02D 37/02; F02D 35/021; F02D 2041/286; F02D 35/027; F02D 41/32; F02P 5/153; F02P 5/1455; F02P 5/1526; F02P 5/1522; F02P 5/152; F02P 5/1504; F02P 5/1555; F02P 17/12; F02P 5/1521; F02P 2041/286; Y02T 10/46; G01L 23/225; G01L 23/22
USPC ................. 701/101, 102, 104, 105, 106, 115; 73/114.15, 114.16, 114.18, 114.26, 73/114.27, 114.28; 702/50; 123/406.41, 123/406.16, 406.21, 406.42, 406.47, 435, 123/406.37, 406.32, 406.43, 406.19, 123/406.22, 406.23, 406.26, 406.34, 406.35
See application file for complete search history.

(56) References Cited

U.S. PATENT DOCUMENTS 4,892,075 A * 1/1990 Iriyama et al. ............ 123/406.27
7,360,523 B2 * 4/2008 Sloane et al. .................. 123/305
(Continued)

FOREIGN PATENT DOCUMENTS

JP A-56-124673 9/1981
JP B2-62-53710 11/1987
(Continued)

OTHER PUBLICATIONS

International Search Report issued in International Application No. PCT/JP2009/050461; Mailed Oct. 2, 2009.

*Primary Examiner* — Stephen K Cronin
*Assistant Examiner* — Raza Najmuddin
(74) *Attorney, Agent, or Firm* — Oliff PLC (57) ABSTRACT The present invention relates to a control device for a spark-ignition internal combustion engine provided with a cylinder pressure sensor and aims to facilitate optimal control of a combustion state even in a situation where an operating condition is variable.
A predetermined combustion-related parameter whose value is uniquely determined by behavior of a change in cylinder pressure relative to a crank angle is used as a control value. Ignition timing is calculated based on the control value in accordance with a calculation rule determined according to a current or target operating condition of the internal combustion engine. The control value resulting from calculation based on a target value of a predetermined physical quantity relating to torque of the internal combustion engine in accordance with a predetermined calculation rule is used as a base value and is corrected by feeding back an output value of the cylinder pressure sensor.

15 Claims, 6 Drawing Sheets

(56) References Cited

U.S. PATENT DOCUMENTS

| | | | |
|---|---|---|---|
| 7,761,223 B2 * | 7/2010 | Wang et al. | 701/114 |
| 8,291,751 B2 * | 10/2012 | Wang et al. | 73/114.02 |
| 2006/0102147 A1 * | 5/2006 | Norimoto et al. | 123/406.47 |
| 2009/0259383 A1 * | 10/2009 | Wang et al. | 701/102 |
| 2010/0280701 A1 * | 11/2010 | Wang et al. | 701/29 |
| 2011/0126803 A1 * | 6/2011 | Soejima et al. | 123/406.26 |

FOREIGN PATENT DOCUMENTS

| | | |
|---|---|---|
| JP | A-63-109283 | 5/1988 |
| JP | A-2005-315129 | 11/2005 |
| JP | A-2006-144645 | 6/2006 |
| JP | A-2006-170183 | 6/2006 |
| JP | A-2007-113555 | 5/2007 |
| WO | WO 2007/049546 A1 | 5/2007 |

* cited by examiner

CONTROL DEVICE FOR INTERNAL COMBUSTION ENGINE

TECHNICAL FIELD

The present invention relates to control devices for an internal combustion engine and more particularly to a control device for a spark-ignition internal combustion engine equipped with a cylinder pressure sensor.

BACKGROUND ART

There is known a method disclosed in JP-A-2006-170183 as a method of adjusting ignition timing by use of a cylinder pressure sensor. According to the method disclosed in this patent document, a combustion ratio at given timing is calculated based on an output value of the cylinder pressure sensor. In addition, combustion start timing, i.e., ignition timing in a combustion chamber is adjusted so that the calculated value may coincide with a target value. Specifically, the ignition timing is adjusted so that the combustion ratio may be 50% at eight crank angle degrees after top dead center. It is known that when the ignition timing corresponds to MBT, the combustion ratio is 50% in the vicinity of 10° after top dead center. The method disclosed in the above-mentioned patent document is a method for achieving ignition at MBT by feeding back the output value of the cylinder pressure sensor. As a specific feedback, an ignition-timing calculation method is disclosed of calculating a deviation between a combustion ratio calculated from the output value of the cylinder pressure sensor and its target value and inputting the calculated deviation into a proportional-integral circuit.

Incidentally, although ignition timing is the same, a combustion state in a cylinder varies depending on the operating conditions of an internal combustion engine, particularly, on a variation in engine speed. Therefore, even if the combustion ratio coincides with the target value at certain ignition timing, when the operating condition varies, the combustion ratio calculated from the output value of the cylinder pressure sensor is varied by the variation of the combustion state to cause a deviation between the combustion ratio and the target value. The method disclosed in the above-mentioned document allows the proportional-integral circuit to correct the ignition timing so as to eliminate the deviation. However, during from the variation of the operating condition until the ignition timing is optimized again, the combustion state deviates from the optimum state. That is to say, the method disclosed in the above-mentioned document has room for improvement in the controllability of the combustion state, specifically, in the controllability in situations where the operating conditions are variable.

DISCLOSURE OF THE INVENTION

It is an object of the present invention to solve the problem as described above and to provide a control device for an internal combustion engine that facilitates optimal control of a combustion state also in a situation where operating conditions are variable.

The control device of the present invention is a control device for a spark-ignition internal combustion engine equipped with a cylinder pressure sensor. According to an aspect of the invention, the control device of the invention includes two calculation means for feedforward controlling ignition timing, means for operating an ignition device of the internal combustion engine in accordance with the ignition timing calculated by the calculation means, and means for feedback controlling the ignition timing.

The two calculation means consists of first calculation means for calculating the ignition timing by use of a predetermined combustion-related parameter as a control value and second calculation means for calculating the control value from a target value relating to torque. The combustion-related parameter used by the first calculation means is a combustion-related parameter whose value is uniquely determined by behavior of a change in cylinder pressure relative to a crank angle. A 50%-combustion point retard amount relative to a predetermined crank angle (e.g., 10° after top dead center) is preferred as such a combustion-related parameter. The first calculation means calculates ignition timing in accordance with a calculation rule determined according to a current or target operating condition of the internal combustion engine by use of such a combustion-related parameter as a control value. The calculation rule includes use of a map. The first calculation means is provided with the map making the connection between e.g. the combustion-related parameter and the ignition timing taking the operating condition of the internal combustion engine as a key. The first calculation means can determine the ignition timing from the current or target operating condition and the control value by use of the map. Incidentally, the operating condition of the present invention is specifically an operating condition having an influence the relationship between the combustion-related parameter and ignition timing. The operating condition includes e.g. engine speed of the internal combustion engine.

The second calculation means calculates a control value in accordance with a predetermined calculation rule. A target value of a predetermined physical quantity relating to torque of the internal combustion engine is used as a target value used to calculate the control value. The calculation rule includes use of a map. The second calculation means is provided with a map associating a combustion-related parameter with the above-mentioned predetermined physical value. The second calculation means can use the map to convert the target value of the predetermined physical quantity to a value of the combustion-related parameter. The predetermined physical quantity is a physical quantity that can be controlled by ignition timing. A preferable physical quantity is one that is not influenced by the above-mentioned operating condition in relation to the combustion-related parameter. For example, torque efficiency represented by a ratio between the generated torque of the internal combustion engine and estimated torque achieved if ignition timing corresponds to MET can be taken as the predetermined physical quantity. In this case, target torque efficiency represented by a ratio between demanded torque from the internal combustion engine and the estimated torque is a target value used to calculate the control value.

The feedback control of the present invention does not directly correct the ignition timing by feeding back the output value of the cylinder pressure sensor but corrects the above-mentioned control value. The first calculation means described earlier calculates the ignition timing corresponding to the control value in accordance with the calculation rule determined according to the operating condition. Therefore, if the operating condition is varied, also the ignition timing is varied by the feedforward control according to such a varied operating condition. Thus, a time-delay does not occur from when the operating condition is varied until the ignition timing is optimized again. Further, the influence of the operating condition on the ignition timing is considered in the calculation process of the first calculation means. Therefore, there is an advantage that it is not necessary to consider the operating condition in calculating a feedback correction value. In this way, it is easy for the control device of the present invention to optimally control the combustion state in a state where the operating conditions are not only constant but variable.

Means for feeding back the output value of the cylinder pressure sensor to the control value include preferred aspects as below. One of the preferred aspects includes means for calculating an actual value of a combustion-related parameter from the output value of the cylinder pressure sensor, means for calculating a feedback correction value from a difference between a value resulting from converting the target value of the physical quantity to the combustion-related parameter and the actual value of the combustion-related parameter, and means for correcting the control value with the feedback correction value. More preferably, this aspect is configured to calculate the feedback correction value from a difference between a value resulting from converting the previous target value of the physical quantity to a combustion-related parameter and the current actual value of the combustion-related parameter.

Another preferable aspect includes means for calculating an actual value of the physical quantity or of torque from the output value of the cylinder pressure sensor, means for calculating a feedback correction value from a difference between the target value and actual value of the physical quantity or of torque, and means for correcting the control value with the feedback correction value. More preferably, the aspect is configured to delay the target value of the physical quantity or of torque in accordance with response lag of an intake air amount relative to throttle operation and to calculate a feedback correction value by use of the target value having subjected to the delay-process.

Preferable further another aspect includes means for calculating an actual value of the physical quantity from the output value of the cylinder pressure sensor, means for converting the actual value of the physical quantity to a value of a combustion-related parameter by use of a map associating a combustion-related parameter with the physical quantity, means for calculating a feedback correction value from a difference between a value resulting from converting the target value of the physical quantity to a combustion-related parameter and a value resulting from converting the actual value of the physical quantity to a combustion-related parameter, and means for correcting the control value with the feedback correction value.

According to a second aspect of the present invention, a control device of the present invention includes calculation means for feedforward controlling ignition timing, and means for operating an ignition device of an internal combustion engine in accordance with ignition timing calculated by the calculation means. The calculating means calculates the ignition timing by use of a predetermined combustion-related parameter as a control value. The combustion-related parameter used by the calculation means is a combustion-related parameter whose value is uniquely determined by behavior of a change in cylinder pressure relative to a crank angle. The calculation means uses such a combustion-related parameter as the control value and calculates the ignition timing in accordance with a calculation rule determined according to a current or target operating condition of the internal combustion engine. The calculation rule includes use of a map. For example, the calculation means is provided with a map making the connection between the combustion-related parameter and the ignition timing while taking the operating condition of the internal combustion engine as a key. The calculation means can determine the ignition timing from the current or target operating condition and the control value by use of the map. According to the second aspect of the present invention, the control device includes means for feedback controlling ignition timing. This means is composed of means for calculating an actual value of a combustion-related parameter from the output value of the cylinder pressure sensor, and means for correcting a control value on the basis of a difference between the target value and actual value of the combustion-related parameter.

DESCRIPTION OF REFERENCE NUMERALS

2 Internal combustion engine
4 Cylinder pressure sensor
24 Calculation section using an efficiency map
26 Calculation section using a main map
32 Feedback controller

BEST MODE FOR CARRYING OUT THE INVENTION

First Embodiment

A first Embodiment of the present invention will be described with reference to FIGS. 1 and 2.

Figure 1:
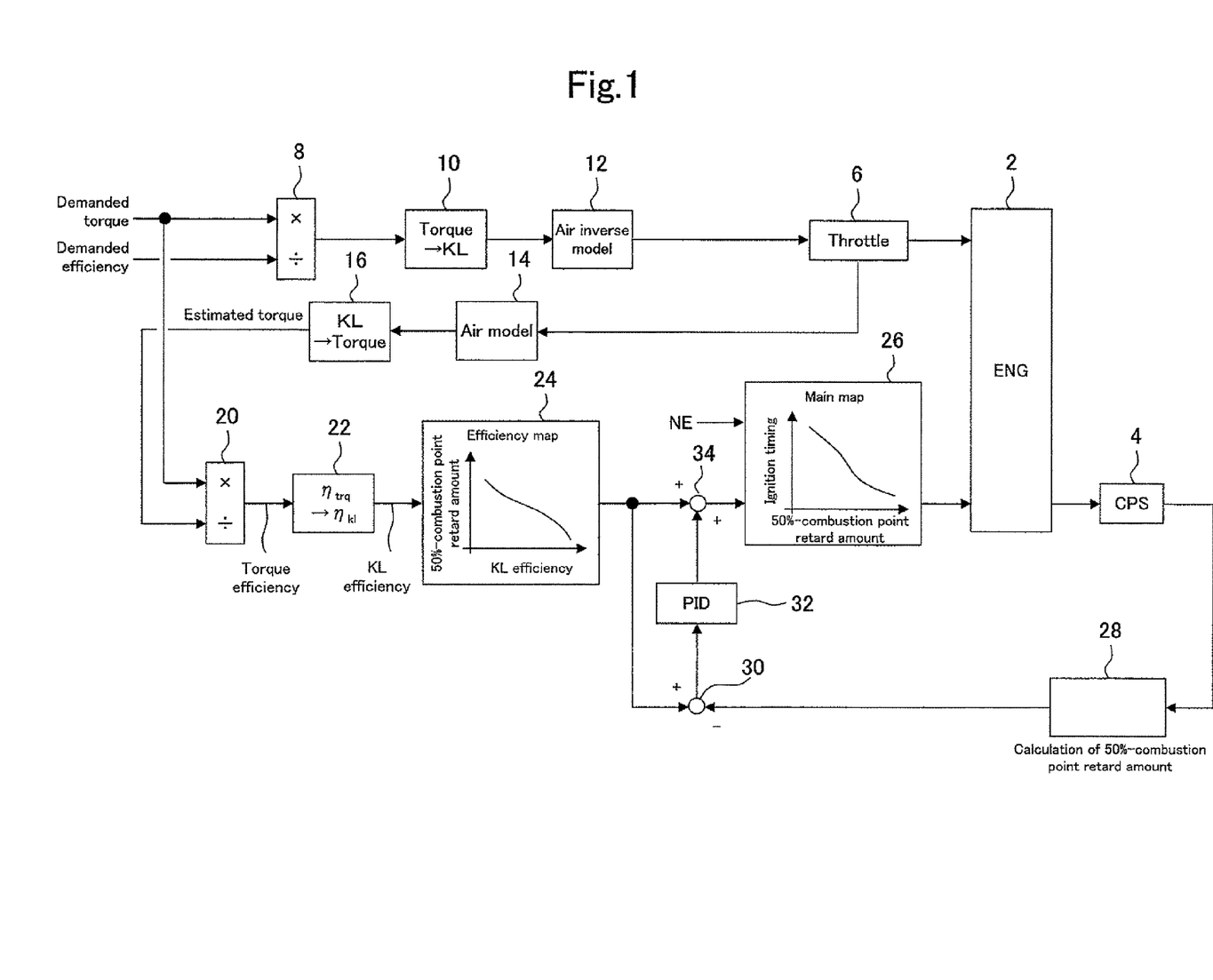
FIG. 1 is a block diagram illustrating a configuration of a control device for an internal combustion engine according to a first embodiment of the present invention.
Figure 2:
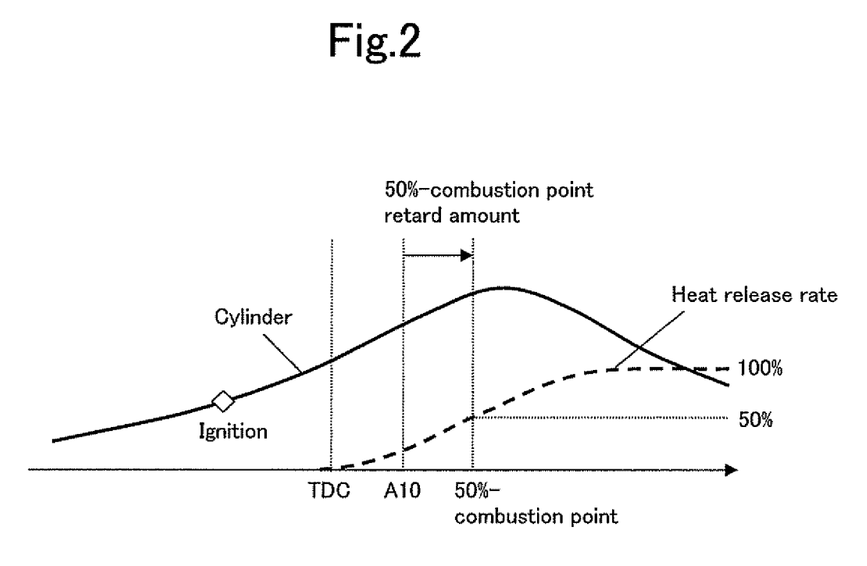
FIG. 2 is a diagram illustrating a variation in cylinder pressure relative to a crank angle and a variation in heat release rate corresponding thereto.

FIG. 1 is a block diagram illustrating a configuration of a control device for an internal combustion engine according to embodiment 1 of the present invention. The control device of the present embodiment is applied to a spark-ignition internal combustion engine and configured as a control device for controlling the operation of a throttle as an actuator and of an ignition device of the spark-ignition internal combustion engine.

The control device of the present embodiment obtains demanded torque and demanded efficiency from a power train manager (not shown) provided at the top of a control system. In addition, the control device controls the internal combustion engine, specifically, intake air amount and ignition timing to achieve these demands. The efficiency here means a rate of whole work to work that can be taken out from the internal combustion engine. The demanded efficiency means a ratio of work intended to be taken out, to work that can be taken out. Hence, the maximum value of the demanded efficiency is equal to 1.

A description is first given of control of an intake air amount exercised in the present embodiment. The control device sends obtained demanded torque and demanded efficiency to a divider 8, which calculates a value by dividing the demanded torque by the demanded efficiency. Since the demanded efficiency is a value equal to or smaller than 1, the value of torque calculated by the divider 8 is a value raised compared with the demanded torque.

Next, the control device allows an air amount conversion section 10 to convert the raised torque calculated by the divider 8 into an air amount (KL). The air amount obtained by the conversion process is a target air amount of the internal combustion engine. Incidentally, the term "the air amount" here means a cylinder intake air amount per one cycle. The cylinder intake air amount may be replaced with filling efficiency (a loading rate) obtained by making the air amount dimensionless. The conversion process uses a map making the connection between torque and an air amount. In the map, various operating conditions having an influence on the relationship between torque and an air amount, such as engine speed, an air-fuel ratio, etc., are taken as keys. However, it is assumed that ignition timing corresponds to MBT.

Next, the control device allows a throttle opening degree setting section 12 to calculate an opening degree from the target air amount. An inverse model of an air model is used to calculate the throttle opening degree. The air model is a physical model of an intake system and results from modeling the response of an air amount with respect to the throttle operation on the basis of fluid dynamics or the like. The control device sets the throttle opening degree converted from the target air amount as an amount of operating the throttle 6 and operates the throttle 6 in accordance with the throttle opening degree thus set.

A description is next given of control of ignition timing. In the present embodiment, a target value used to control ignition timing is torque efficiency. The torque efficiency is defined as a ratio of demanded torque to estimated torque of the internal combustion engine. The estimated torque used to calculate the torque efficiency is calculated based on the throttle opening degree.

To calculate the estimated torque, the control device first obtains an actual opening degree of the throttle 6 from the output value of the throttle opening degree sensor, the rotational amount of a throttle motor or the like. An estimated air amount calculation section 14 calculates an air amount estimated to be achieved at the throttle opening degree thus obtained. A forward model of the air model mentioned above is used to calculate the estimated air amount.

Next, the control device allows a torque conversion section 16 to convert to torque the air amount estimated from the throttle opening degree. The torque obtained in this conversion process is the estimated torque mentioned above. The conversion process uses a map making the connection between an air amount and torque. In the map, various operating conditions having an influence on the relationship between torque and an air amount, such as engine speed, an air-fuel ratio, etc., are taken as keys. However, it is assumed that ignition timing corresponds to MBT. Thus, the estimated torque means torque that can be achieved if the ignition timing corresponds to MBT, i.e., the maximum torque that can be achieved at a current amount of intake air.

The control device sends the obtained demanded torque and estimated torque to a divider 20, which calculates a value by dividing the demanded torque by the estimated torque. The value thus calculated is torque efficiency. The control device allows an efficiency conversion section 22 to convert the torque efficiency to KL efficiency. This conversion process uses a conversion equation or a map. The KL efficiency is a ratio of an air amount demanded to achieve the demanded torque, to the estimated air amount achieved at the current throttle opening degree. In the present embodiment, the KL efficiency is used to control ignition timing.

The control device controls the ignition timing to achieve the KL efficiency mentioned above. The ignition timing control method exercised in the present embodiment can be explained as a combination of feedforward control with feedback control.

The feedforward control determines a predetermined combustion-related parameter value on the basis of the target value of the KL efficiency and sets ignition timing by use of the combustion-related parameter value as a control value. The combustion-related parameter used in the present embodiment is a retard amount of a 50%-combustion point relative to a 10 crank angle degrees after top dead center (hereinafter, ATDC 10°). The 50%-combustion point is a crank angle in which a heat release rate (combustion rate) is 50%. FIG. 2 illustrates both a variation in cylinder pressure relative to a crank angle at the time of ignition at certain timing and a variation in heat release rate corresponding thereto. A heat release rate and a waveform of cylinder pressure have a correlation therebetween at any crank angle. Therefore, the heat release rate at any crank angle can be calculated from the corresponding waveform of cylinder pressure. The torque of the internal combustion engine is maximized when the 50%-combustion point exists close to ATDC 10° and the ignition timing at that time is the so-called MBT. When the 50%-combustion point exists at ATDC 10°, the efficiency of the internal combustion engine has a maximum value of 1. As the retard amount of the 50%-combustion point relative to ATDC 10° (hereinafter, simply also called the 50%-combustion point retard amount) increases, the efficiency of the internal combustion engine drops. The 50%-combustion point retard amount and the efficiency of the internal combustion engine have one-to-one relationship, which is not influenced by the operating conditions such as engine speed, etc. Thus, if ignition timing is controlled by use of the 50%-combustion point retard amount as a control value, the combustion state of the internal combustion engine can be controlled into a desired state.

The control device allows a calculation section 24 to calculate the 50%-combustion point retard amount corresponding to the target value of the KL efficiency. The calculation section 24 has a map making the connection between the KL efficiency and the 50%-combustion point retard amount. This map is created based on statistic data obtained from an experiment. The map is hereinafter called the efficiency map. The calculation section 24 uses this efficiency map to convert the target value of the KL efficiency to a 50%-combustion point retard amount. The value of the 50%-combustion point retard amount obtained by this conversion process is a target value of the 50%-combustion point retard amount and also is a base value of a control value used to determine ignition timing.

The control device further allows a calculation section 26 to determine ignition timing from the 50%-combustion point retard amount as a control value. The calculation section 26 has a map making the connection between the 50%-combustion point retard amount and the ignition timing. This map is hereinafter called a main map. The feature of the main map is that the 50%-combustion point retard amount and the ignition timing are correlated with each other while taking the operating conditions of the internal combustion engine as a key. The operating conditions taken as the key include at least engine speed (NE). If a target air-fuel ratio is variable, it is also included in the operating conditions. If valve timing is variable, it is also included in the operating conditions. If these operating conditions are varied, the waveform of cylinder pressure relative to a crank angle is varied even at the same ignition timing, with the result that the 50%-combustion point retard amount is varied. The main map is created based on statistic data obtained from experiments conducted by changing the various operating conditions taken as the key. To make the description simple herein, the operating condition considered in the main map is only engine speed. The calculation section 26 uses the main map to determine the ignition timing from current engine speed and the control value. The control device operates an ignition device of the internal combustion engine 2 at the ignition timing calculated by the calculation section 26.

The above is the ignition timing control through the feedforward control. Due to the influence of an individual difference of the internal combustion engine 2 and of adaptive accuracy of the main map, it is not always possible for only the feedforward control to control the combustion state of the internal combustion engine into a desired state. Therefore, what is combined with the feedforward control is feedback control described below.

The feedback control uses an output value of the cylinder pressure sensor (CPS) 4. The cylinder pressure sensor 4 is attached to part of or all of cylinders of the internal combustion engine. The control device allows a calculation section 28 to calculate an actual value of the 50%-combustion point retard amount from the output value of the cylinder pressure sensor 4. The 50%-combustion point retard amount is a combustion-related parameter uniquely determined by the behavior of changes in cylinder pressure relative to a crank angle. Accordingly, the value of the 50%-combustion point retard amount is uniquely calculated by processing the output value of the cylinder pressure sensor 4 according to a predetermined calculation rule. Incidentally, if the cylinder pressure sensor 4 is attached to each cylinder, the 50%-combustion point retard amount is calculated for each cylinder. If the cylinder pressure sensor 4 is attached to only one cylinder, the 50%-combustion point retard amount calculated for the cylinder represents those of the other cylinders.

The control device sends the 50%-combustion point retard amount (the target value) calculated by the calculation section 24 and the 50%-combustion point retard amount (the actual value) calculated by the calculation section 26 to a subtracter 30, which calculates a deviation therebetween. The control device sends the deviation between the 50%-combustion point retard amounts to an FB controller 32, which calculates an FB correction value. The dimension of the FB correction value calculated here is equal to that of the 50%-combustion point retard amount. Incidentally, in the figure, a PID circuit is used as the FB controller 32; however, the other controllers may be used.

Next, the control device sends the FB correction value calculated by the FB controller 32 and the control value of the 50%-combustion point retard amount to an adder 34, which adds both of them to correct the control value of the 50%-combustion point retard amount. In the next step, the calculation section 26 makes a calculation based on the control value of the 50%-combustion point retard amount corrected by the FB correction value. A gain of the FB controller 32 is set such that the FB correction value calculated by the FB controller 32 positively reduces the deviation between the target value and actual value of the 50%-combustion point retard amount.

In the present embodiment, the feedback control as described above is combined with the feedforward control. The feedback control exercised in the present embodiment has one feature in which as described above the 50%-combustion point retard amount is used as the control value and the output value of the cylinder pressure sensor 4 is fed back to the control value. In other words, the output value of the cylinder pressure sensor 4 is not directly fed back to the set value of ignition timing. As seen from the configuration of the main map, this is because the relationship between the ignition timing and the 50%-combustion point retard amount, i.e., the relationship between the ignition timing and the output value of the cylinder pressure sensor, taken from a broader standpoint, is varied depending on the operating conditions including engine speed. If the output value of the cylinder pressure sensor 4 is directly fed back to the set value of ignition timing, the 50%-combustion point retard amount deviates according to the variation in engine speed. Thus, the combustion state deviates from an optimum state. In contrast to this, according to the present embodiment, the ignition timing is determined according to the control value of the 50%-combustion point retard amount with the current engine speed taken as a key in the main map. Therefore, if the engine speed is varied, the ignition timing is varied by the feedforward control according to the variation of the engine speed. Thus, a time-lag does not occur from the variation of the operating condition until the next optimization of the ignition timing. Further, the influence of the operating conditions such as engine speed, etc., on the ignition timing is taken into consideration in the main map. Therefore, it is not necessary to take into consideration the operating conditions such as engine speed, etc., in calculating the FB correction value. Thus, the control device of the present embodiment can facilitate the optimal control of the combustion state in a state where the operating conditions are not only constant but variable.

The control device according to the present embodiment of the present invention has been described thus far. The corresponding relationship between the present embodiment and the present invention is as below. In the configuration of FIG. 1, the calculation section 26 corresponds to "first calculation means" of the invention and the main map equipped in the calculation section 26 corresponds to "a first map" of the invention. The calculation section 24 corresponds to "second calculation means" of the invention and the efficiency map equipped in the calculation section 24 corresponds to "a second map" of the invention. The calculation section 28, the subtracter 30, the FB controller 32, and the adder 34 constitute "feedback correction means" of the present invention.

Second Embodiment

A second embodiment of the present invention will next be described with reference to FIG. 3.

Figure 3:
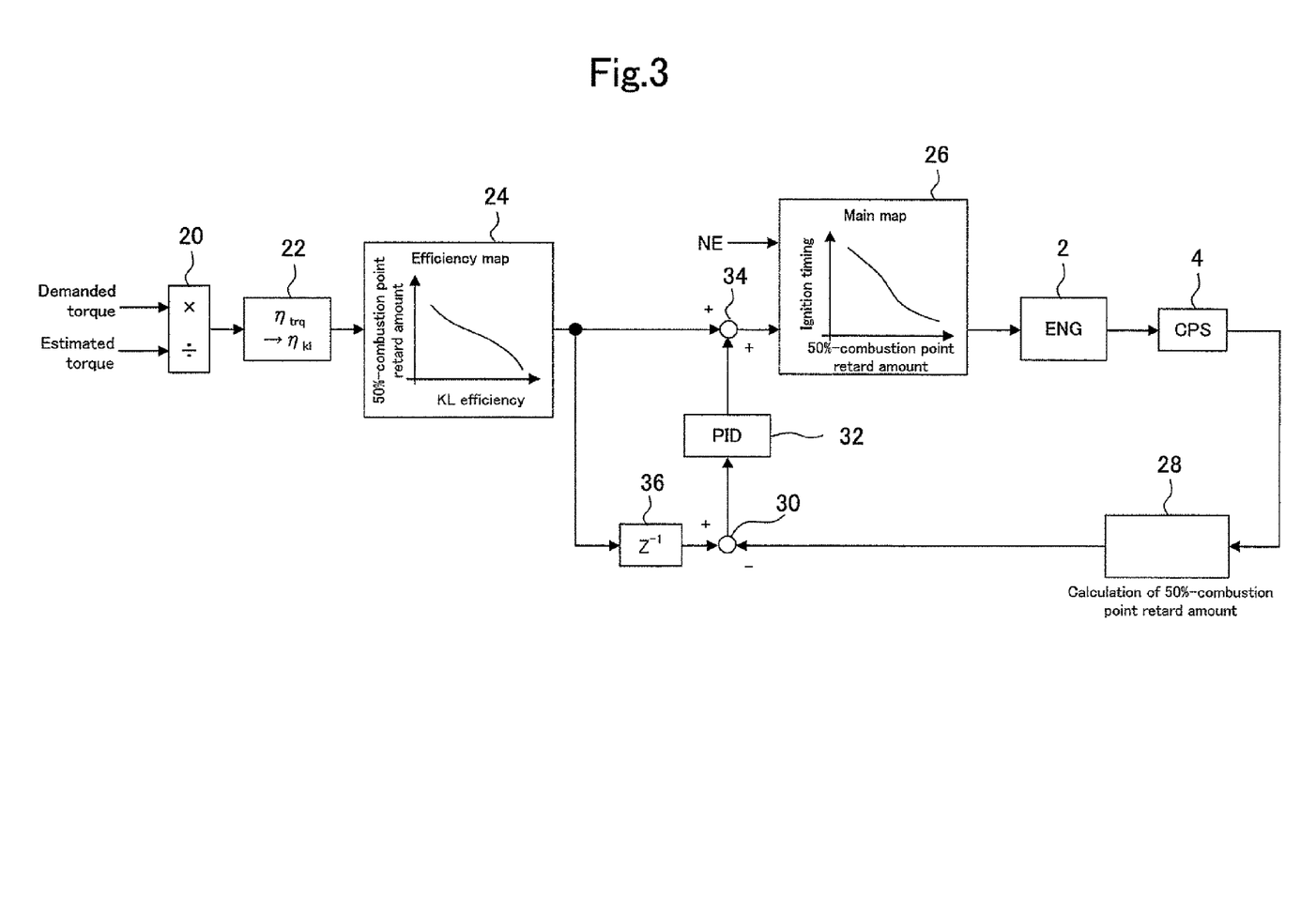
FIG. 3 is a block diagram illustrating a configuration of a control device for the internal combustion engine according to a second embodiment of the present invention.

FIG. 3 is a block diagram illustrating a configuration of a control device for an internal combustion engine according to the second embodiment of the present invention. In FIG. 3, elements common to those in the first embodiment are denoted with like reference numerals. In the following, the descriptions of the configurations and functions common to those of the first embodiment are omitted or abbreviated and configurations and functions different from those of the first embodiment are mainly described.

In comparison with the first embodiment, the present embodiment is characterized by including a delay device 36 on a path adapted to transmit a signal from the calculation section 24 to the subtracter 30. The delay device 36 delays a target value of a 50%-combustion point retard amount calculated by the calculation section 24 by one sample time and inputs it to the subtracter 30. The one sample time is matched with the cycle of ignition for each cylinder. Therefore, the target value of the 50%-combustion point retard amount inputted to the subtracter 30 is a target value used to set the ignition timing in the previous step.

A computing unit 28 calculates the actual value of the 50%-combustion point retard amount from the output value of the cylinder pressure sensor 4. The cylinder pressure used for such calculation is a cylinder pressure generated by the combustion of the previous step. Therefore, the 50%-combustion point retard amount calculated by the computing unit 28 means an actual value of the 50%-combustion point retard amount at the previous step. The control device of the present embodiment can compare the target value of the 50%-combustion point retard amount set in the previous step with the actual value of the 50%-combustion point retard amount achieved based on the target value. Thus, the feedback control is possible with a higher degree of accuracy.

Third Embodiment

A third embodiment of the present invention will next be described with reference to FIG. 4.

Figure 4:
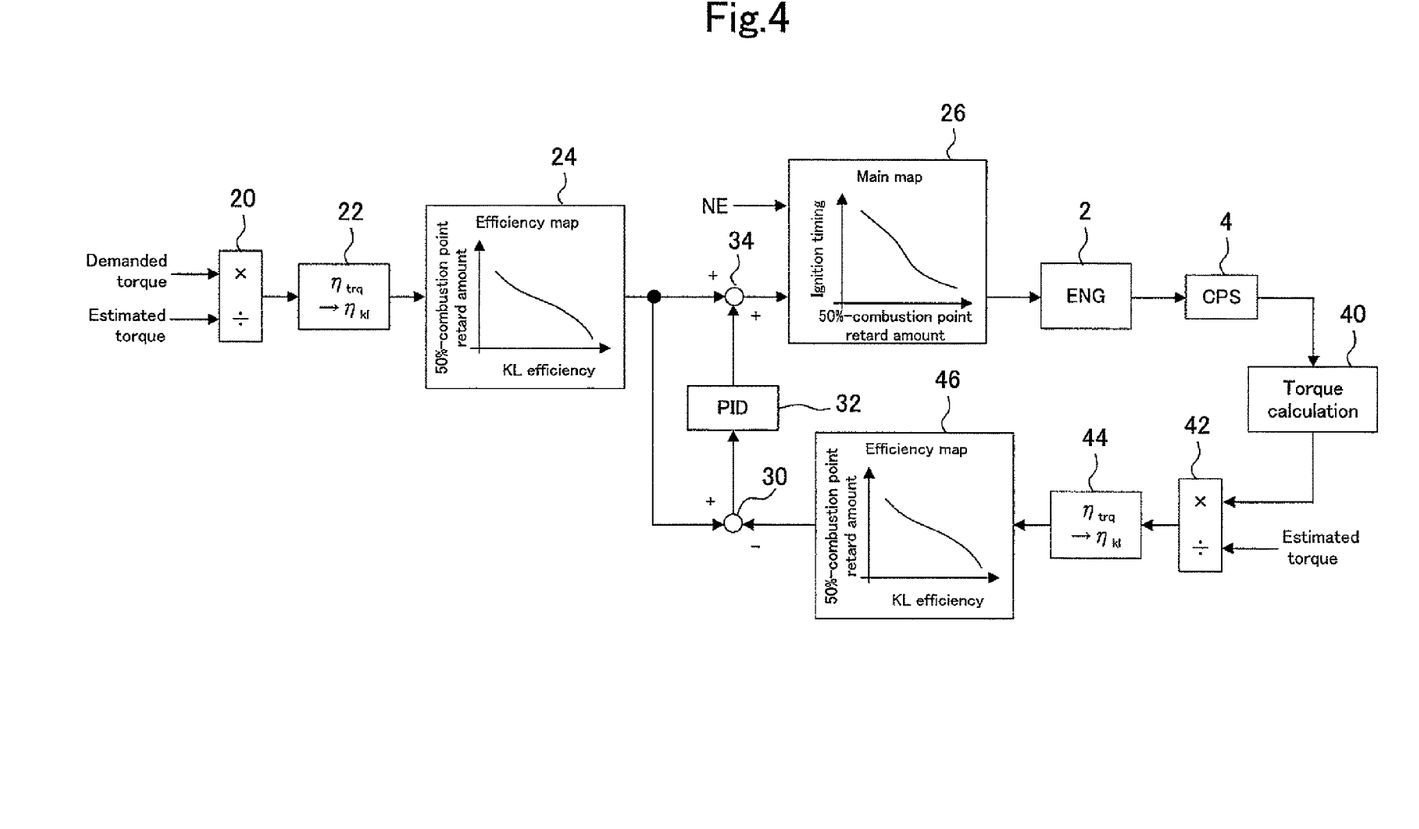
FIG. 4 is a block diagram illustrating a configuration of a control device for the internal combustion engine according to a third embodiment of the present invention.

FIG. 4 is a block diagram illustrating a configuration of a control device for an internal combustion engine according to the third embodiment of the present invention. In FIG. 4, elements common to those of the already-described embodiments are denoted with like reference numerals. In the following, the descriptions of the configurations and functions common to those of the already-described embodiments are omitted or abbreviated and configurations and functions different from those of the already-described embodiments are mainly described.

In the already-described embodiments, one of the features is to exercise the feedforward control and the feedback control by use of the 50%-combustion point retard amount as a control value. However, in the internal combustion engine 2, the relationship between torque or efficiency and the 50%-combustion point retard amount, between ignition timing and the 50%-combustion point retard amount, and between operating conditions such as engine speed and the like and the 50%-combustion point retard amount are nonlinear. Therefore, in some design of the FB controller 32, there is a possibility that it is difficult to achieve rapid following capability of the actual value relative to the target value if the operating conditions or demanded torque varies. To eliminate such a possibility, the present embodiment configures a control device as described below to reduce the influence of the nonlinearity of the 50%-combustion point retard amount on the controllability of ignition timing.

In comparison with the already-described embodiments, the present embodiment is characterized in that torque actually generated by the internal combustion engine is calculated from the output value of the cylinder pressure sensor 4 and based on the actual torque an actual value of the 50%-combustion point retard amount is calculated. In addition, it is another feature of the present embodiment to use a circuit configured similarly to a circuit to calculate a target value of the 50%-combustion point retard amount, as a circuit to calculate the actual value of the 50%-combustion point retard amount.

The control device of the present embodiment allows a calculation section 40 to calculate torque generated by the internal combustion engine from an output value of the cylinder pressure sensor 4. The control device next sends the actual torque calculated and estimated torque to a divider 42, which calculates a value obtained by dividing the actual torque by the estimated torque. The estimated torque is maximum torque achievable at a current amount of intake air as described in the first embodiment. The value calculated by the divider 20 is a target value of torque efficiency, whereas the value calculated by the divider 42 represents actual torque efficiency.

Next, the control device allows an efficiency conversion section 44 to convert the actual torque efficiency into KL efficiency. The conversion process uses the same conversion equation or map as that used in the efficiency conversion section 22. The value calculated by the efficiency conversion section 22 is a target value of the KL efficiency, whereas the value calculated by the efficiency conversion section 44 represents actual KL efficiency.

The control device allows a calculation section 46 to calculate a 50%-combustion point retard amount corresponding to the actual value of the KL efficiency. The calculation section 46 is equipped with a map making the connection between the KL efficiency and the 50%-combustion point retard amount. This map is the same as the efficiency map equipped in the calculation section 24. The calculation section 46 uses this efficiency map to convert the actual value of the KL efficiency to the 50%-combustion point retard amount, thereby calculating an actual value of the 50%-combustion point retard amount.

In the present embodiment, the feedback control is exercised based on a deviation between the actual value of the 50%-combustion point retard amount calculated as described above and the target value of the 50%-combustion point retard amount calculated by the calculation section 24. In this way, the nonlinearity of the 50%-combustion point retard amount can be considered not only in the feedforward control but also in the feedback control. Thus, readiness and robustness relative to variations in operating conditions and in demanded torque can be enhanced.

Fourth Embodiment

A fourth embodiment of the present invention will subsequently be described with reference to FIG. 5.

Figure 5:
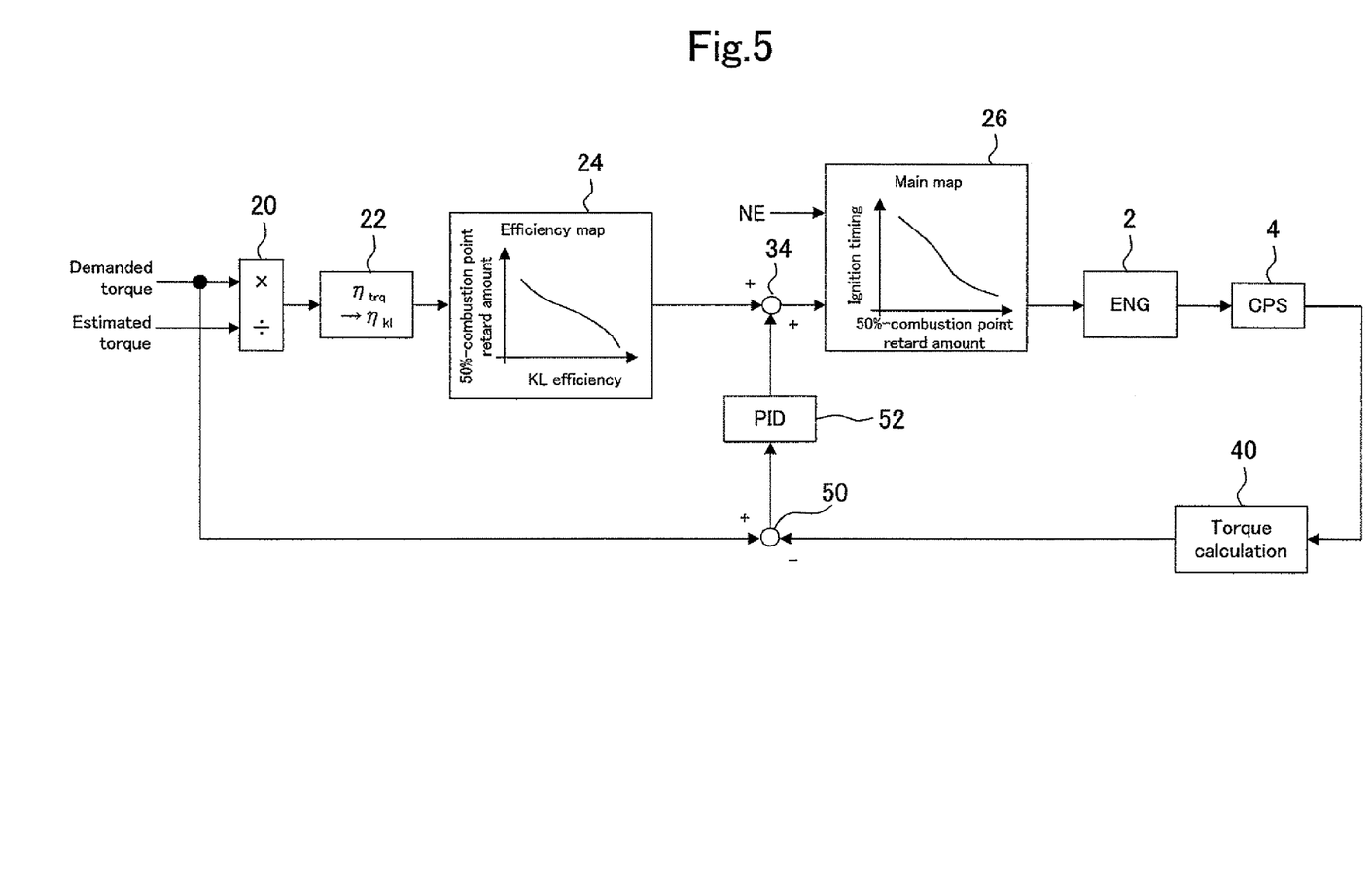
FIG. 5 is a block diagram illustrating a configuration of a control device for the internal combustion engine according to a fourth embodiment of the present invention.

FIG. 5 is a block diagram illustrating a configuration of a control device for an internal combustion engine according to the fourth embodiment of the present invention. In FIG. 5, elements common to those of the already-described embodiments are denoted with like reference numerals. In the following, the descriptions of the configurations and functions common to those of the already-described embodiments are omitted or abbreviated and configurations and functions different from those of the already-described embodiments are mainly described.

In comparison with the already-described embodiments, the feature of the present embodiment is to use demanded torque as a target value in feedback control while using a 50%-combustion point retard amount as a control value in feedforward control. The feedforward control uses an efficiency map used to convert a target value of KL efficiency to the 50%-combustion point retard amount. The efficiency map is created based on statistic data obtained from, an experiment. However, there is a possibility that the efficiency map may deviate from reality because of the influence of a data error or of the individual difference of the internal combustion engine 2. Therefore, even if the actual value of the 50%-combustion point retard amount can be controlled to a target value, there is a possibility that a deviation may occur between the actual torque obtained therefrom and demanded torque. To eliminate such a possibility, the present embodiment configures a control device described below to make it possible to accurately control actual torque to demanded torque.

The control device of the present embodiment allows the calculation section 40 to calculate torque generated by the internal combustion engine from an output value of a cylinder pressure sensor 4. Next, the control device sends demanded torque and the actual torque calculated by the calculation section 40 to a subtracter 50, which calculates a deviation therebetween. The control device sends the deviation of torque to an FB controller 52, which calculates an FB correction value. The FB controller 52 sets a gain so as to allow the dimension of the FE correction value thus calculated to coincide with that of the 50%-combustion point retard amount. The gain of the FB controller 52 is set such that the FB correction value calculated by the FB controller 52 positively reduces the deviation between the target value and actual value of the 50%-combustion point retard amount.

As described above, the deviation between the demanded torque and the actual torque is fed back to the control value of the 50%-combustion point retard amount. This can accurately control the actual torque to the demanded torque. The control device configured as in FIG. 5 does not need to consider operating conditions such as engine speed and the like in calculating the FB correction value. This is because the main map takes into consideration the influence of the operating conditions such as engine speed and the like on ignition timing. Thus, the control device of the present embodiment facilitates optimal control of a combustion state so as to allow the actual torque to become equal to the demanded torque in a state where the operating conditions are not only constant but also variable.

Fifth Embodiment

A fifth embodiment of the present invention will lastly be described with reference to FIG. 6.

Figure 6:
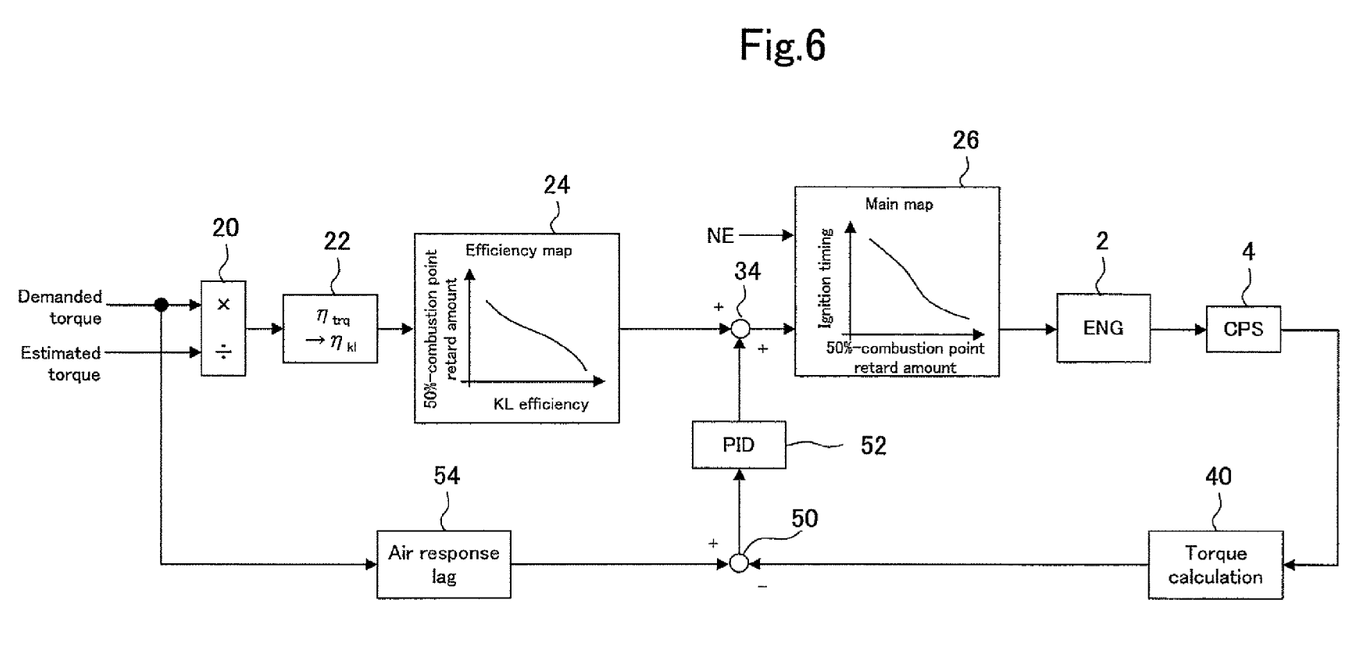
FIG. 6 is a block diagram illustrating a configuration of a control device for the internal combustion engine according to a fifth embodiment of the present invention.

FIG. 6 is a block diagram illustrating a configuration of a control device for an internal combustion engine according to the fifth embodiment of the present invention. In FIG. 6, elements common to those in the already-described embodiments are denoted with like reference numerals. In the following, the descriptions of the configurations and functions common to those of the already-described embodiments are omitted or abbreviated and configurations and functions different from those of the already-described embodiments are mainly described.

The present embodiment corresponds to a further improvement of the fourth embodiment. The fourth embodiment exercises the feedback control based on the deviation between the demanded torque and the actual torque. However, a time-based deviation exists between the demanded torque and the actual torque. Specifically, not a small time-delay exists from the time when the demanded torque is inputted into the control device and the internal combustion engine 2 is controlled based on the demanded torque thus inputted, to the time when such a control result appears as the actual generated torque. Because of this, for example, if the demanded torque is increased in a stepwise drastic manner, there is a possibility that a large deviation occurs between the demanded torque and the actual torque so that ignition timing may excessively be advanced according to such a deviation.

The control device of the present embodiment includes a delay device 54 in a path adapted to transmit a demanded torque to the subtracter 30. The delay device 54 delays the demanded torque in accordance with a response lag of an intake air amount relative to throttle operation and sends the demanded torque thus delayed to a subtracter 50. This is because a main cause of the time-delay occurring between the demanded torque and the actual torque is the response lag of the intake air amount relative to the throttle operation. The delay device 54 may be a simple first-order lag element or the physical model such as the air model described earlier.

Since the demanded torque is processed by the delay device 54, the time-based deviation between the demanded torque and the actual torque is corrected. Therefore, the demanded torque can be compared with the actual torque achieved based on the demanded torque. Thus, the accuracy of the feedback control relative to the variation of the demanded torque can be enhanced.

Others

The embodiments of the present invention have been described thus far; however, the invention is not limited to the embodiments described above. The present invention can be implemented while variously modifying the above-described embodiments in a range not departing from the gist thereof. For example, the embodiments described above may be modified as below for implementation.

While the above-described embodiments use the 50%-combustion point retard amount to exercise the ignition timing control, they can use other combustion-related parameters. For example, the combustion-related parameters can be obtained from the pressure waveform outputted from the cylinder pressure sensor. Specifically, examples of the combustion-related parameters include a peak value of cylinder pressure, pressure waveform or its area of a predetermined crank angle range, and pressure-ingredient in the predetermined crank angle range. Alternatively, combustion-related parameters may be used that can be calculated from the output value of the cylinder pressure sensor, such as a heat release rate, heat production, a combustion rate, or a change ratio of generated heat. In short, the combustion-related parameter whose value is uniquely determined by the behavior of the changes in cylinder pressure relative to a crank angle can be used in place of the 50%-combustion point retard amount.

In the above-described embodiments, the KL efficiency is converted to the 50%-combustion point retard amount by the map. However, the 50%-combustion point retard amount may be obtained by taking other physical quantities relating to torque of the internal combustion engine taken as target values. For example, torque efficiency, a torque down rate (amount), demanded torque or the like may be used. However, it is preferred that the physical quantities used in the map be dimensionless physical quantities in which operating conditions are not related with the relationship between their values and the 50%-combustion point retard amount.

The efficiency map used in the above-described embodiments can be replaced with a numerical expression resulting from approximation of the relationship between the KL efficiency or torque efficiency and the 50%-combustion point retard amount. Similarly, also the main map can be replaced with a numerical expression resulting from approximation of the relationship among the operating conditions such as engine speed and the like, ignition timing, and the 50%-combustion point retard amount. Alternatively, a numerical expression resulting from approximation of the relationship between ignition timing and the 50%-combustion point retard amount may be prepared for each of operating conditions.

The invention claimed is:

1. A control device for a spark-ignition internal combustion engine equipped with a cylinder pressure sensor, the control device comprising:
   a controller having control logic configured to:
      (i) calculate ignition timing based on a control value in accordance with a calculation rule determined according to a current or target operating condition of the internal combustion engine, a predetermined combustion-related parameter whose value is uniquely determined by behavior of a change in cylinder pressure relative to a crank angle being used as the control value;

(ii) calculate the control value based on a target value of a predetermined physical quantity relating to torque of the internal combustion engine, in accordance with a predetermined calculation rule;

(iii) operate an ignition device of the internal combustion engine in accordance with the ignition timing calculated based on the control value; and (iv) correct the control value by feeding back an output value of the cylinder pressure sensor.

2. The control device according to claim 1, wherein the calculating of the ignition timing includes:

determining the ignition timing from the current or target operating condition and the control value by use of a first map that correlates the combustion-related parameter with the ignition timing based on the operating condition of the internal combustion engine.

3. The control device according to claim 1, wherein the calculating of the control value includes:

converting the target value of the physical quantity to a value of the combustion-related parameter by use of a second map that correlates the physical quantity with the combustion-related parameter.

4. The control device according to claim 1, wherein the correcting of the control value includes:

calculating an actual value of the combustion-related parameter from the output value of the cylinder pressure sensor;

calculating a feedback correction value from a difference between a value resulting from converting the target value of the physical quantity to the combustion-related parameter and the actual value of the combustion-related parameter; and correcting the control value with the feedback correction value.

5. The control device according to claim 4, wherein the calculating of the feedback correction value includes:

calculating the feedback correction value from a difference between a value resulting from converting a previous target value of the physical quantity to the combustion-related parameter and a current actual value of the combustion-related parameter.

6. The control device according to claim 1, wherein the correcting of the control value includes:

calculating an actual value of the physical quantity or of torque from the output value of the cylinder pressure sensor;

calculating a feedback correction value from a difference between a target value and an actual value of the physical quantity or of torque; and correcting the control value with the feedback correction value.

7. The control device according to claim 6, wherein the calculating of the feedback correction value includes:

delaying the target value of the physical quantity or of torque in accordance with a response lag of an intake air amount relative to throttle operation, and using the target value thus delayed to calculate the feedback calculation value.

8. The control device according to claim 3, wherein the correcting of the control value includes:

calculating an actual value of the physical quantity from the output value of the cylinder pressure sensor;

converting the actual value of the physical quantity to a value of the combustion-related parameter by use of the second map;

calculating a feedback correction value from a difference between a value resulting from converting the target value of the physical quantity to the combustion-related parameter and a value resulting from converting the actual value of the physical quantity to the combustion-related parameter; and correcting the control value with the feedback correction value.

9. The control device according to claim 1, wherein the combustion-related parameter is a 50%-combustion point retard amount.

10. The control device according to claim 1, wherein the operating condition includes at least engine speed.

11. The control device according to claim 1, wherein the physical quantity is torque efficiency represented by a ratio between torque generated by the internal combustion engine and estimated torque achieved if the ignition timing corresponds to MBT and the target value of the physical quantity is target torque efficiency represented by a ratio between demanded torque from the internal combustion engine and the estimated torque.

12. A control device for a spark-ignition internal combustion engine equipped with a cylinder pressure sensor, the control device comprising:

a controller having control logic configured to:

(i) calculate ignition timing based on a control value in accordance with a calculation rule determined according to a current or target operating condition of the internal combustion engine, a predetermined combustion-related parameter whose value is uniquely determined by behavior of a change in cylinder pressure relative to a crank angle being used as the control value;

(ii) operate an ignition device of the internal combustion engine in accordance with the ignition timing calculated based on the control value;

(iii) set a target value of the combustion-related parameter;

(iv) calculate an actual value of the combustion-related parameter from an output value of the cylinder pressure sensor; and (v) correct the control value based on a difference between the target value and actual value of the combustion-related parameter.

13. The control device according to claim 12, wherein the calculating of the ignition timing includes:

determining the ignition timing from a current or target operating condition and the control value by use of a map that correlates the combustion-related parameter with the ignition timing based on the operating condition of the internal combustion engine.

14. A controller-implemented method of controlling a spark-ignition internal combustion engine equipped with a cylinder pressure sensor, the method comprising:

calculating ignition timing based on a control value in accordance with a calculation rule determined according to a current or target operating condition of the internal combustion engine, a predetermined combustion-related parameter whose value is uniquely determined by behavior of a change in cylinder pressure relative to a crank angle being used as the control value;

calculating the control value based on a target value of a predetermined physical quantity relating to torque of the internal combustion engine, in accordance with a predetermined calculation rule;

operating an ignition device of the internal combustion engine in accordance with the ignition timing calculated based on the control value; and correcting the control value by feeding back an output value of the cylinder pressure sensor.

15. A controller-implemented method of controlling a spark-ignition internal combustion engine equipped with a cylinder pressure sensor, the method comprising:

calculating ignition timing based on a control value in accordance with a calculation rule determined according to a current or target operating condition of the internal combustion engine, a predetermined combustion-related parameter whose value is uniquely determined by behavior of a change in cylinder pressure relative to a crank angle being used as the control value;

operating an ignition device of the internal combustion engine in accordance with the ignition timing calculated based on the control value;

setting a target value of the combustion-related parameter;

calculating an actual value of the combustion-related parameter from an output value of the cylinder pressure sensor; and correcting the control value based on a difference between the target value and actual value of the combustion-related parameter.

* * * * *